Figure 1:
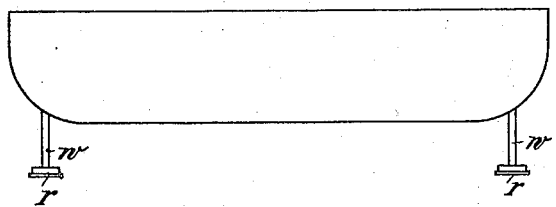

G. MEYER & E. WALTZ.
TOWING SYSTEM FOR SHIPS.
APPLICATION FILED APR. 21, 1914.

1,275,286.

Patented Aug. 13, 1918.
5 SHEETS—SHEET 1.

Witnesses
Elsie Swenson
Ray J. Ernst.

Inventors
Georg Meyer and Emil Waltz
by
atty

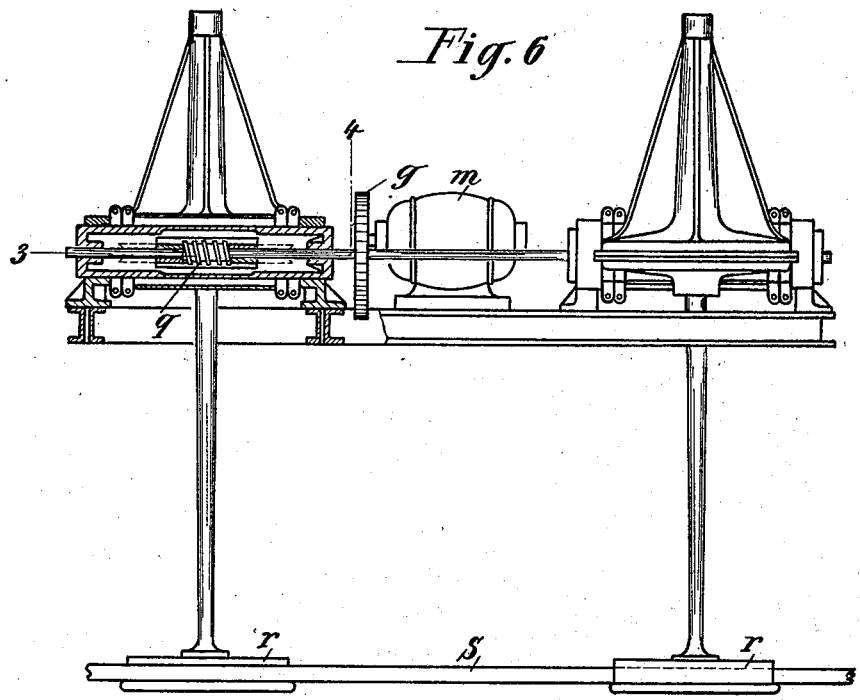
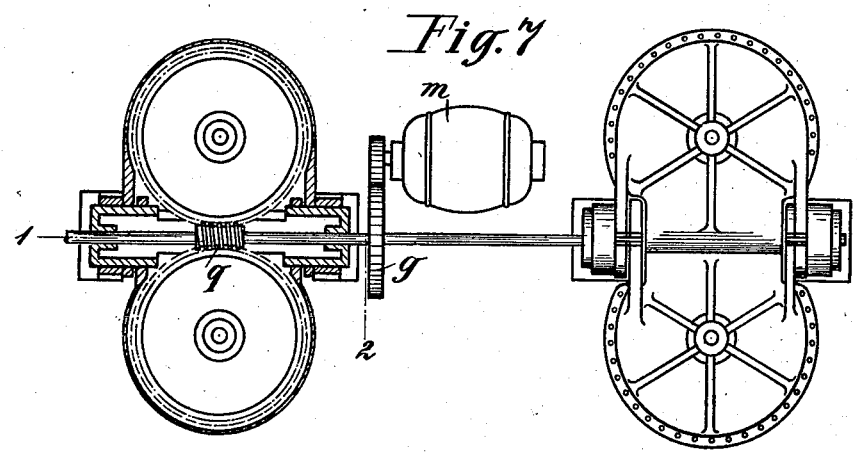

G. MEYER & E. WALTZ.
TOWING SYSTEM FOR SHIPS.
APPLICATION FILED APR. 21, 1914.

1,275,286.

Patented Aug. 13, 1918.
5 SHEETS—SHEET 3.

G. MEYER & E. WALTZ.
TOWING SYSTEM FOR SHIPS.
APPLICATION FILED APR. 21, 1914.
1,275,286.
Patented Aug. 13, 1918.
5 SHEETS—SHEET 4.
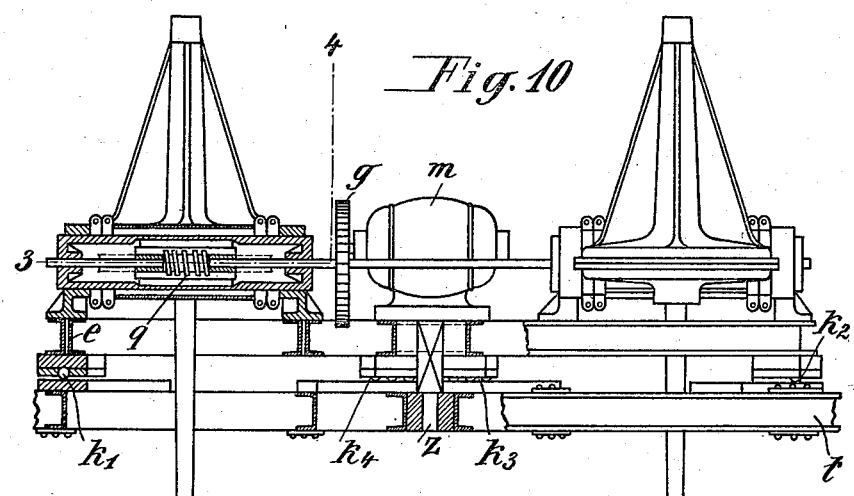
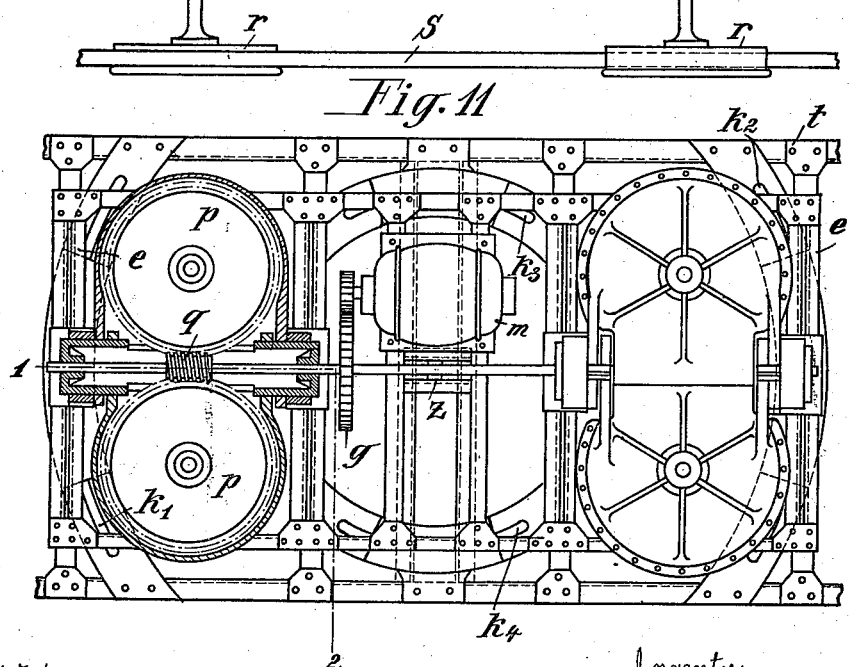

G. MEYER & E. WALTZ.
TOWING SYSTEM FOR SHIPS.
APPLICATION FILED APR. 21, 1914.

1,275,286.

Patented Aug. 13, 1918.
5 SHEETS—SHEET 5.

UNITED STATES PATENT OFFICE.

GEORG MEYER, OF BERLIN-CHARLOTTENBURG, AND EMIL WALTZ, OF BERLIN-STEGLITZ, GERMANY, ASSIGNORS TO SIEMENS-SCHUCKERTWERKE, G. M. B. H., OF BERLIN, GERMANY, A CORPORATION OF GERMANY.

TOWING SYSTEM FOR SHIPS.

1,275,286.   Specification of Letters Patent.   Patented Aug. 13, 1918.

Application filed April 21, 1914. Serial No. 833,385.

*To all whom it may concern:*

Be it known that we, GEORG MEYER, a German citizen, and resident of Berlin-Charlottenburg, Germany, and EMIL WALTZ, a German citizen, and resident of Berlin-Steglitz, Germany, have invented certain new and useful Improvements in Towing Systems for Ships, of which the following is a specification.

In towing systems in which the tug-boat moves along a flexible guide-rail mounted on the bottom of a river or canal by means of driven friction rollers, such as that described for instance in the United States Patent No. 1,075,111, granted under date May 20, 1913, to Richard Koss, assignor to the Siemens Schuckertwerke, G. m. b. H. of Berlin, Germany, it is extremely desirable to increase the capability of the tug-boat to take curves of the river or canal. Our present invention has for its object to solve this problem, and it briefly consists in assembling one or more pairs of friction rollers to form a unitary driving mechanism, and in arranging the rollers of each pair to rock in common about one horizontal axis. If desired, each pair may also swing about a vertical axis. In known friction-wheel mechanisms of the type referred to the single rollers are mounted to swing about two axes parallel to the longitudinal direction of the tug-boat, in order to enable the pairs of friction rollers to be swung apart when being applied to or cleared entirely from the guide rail. This construction has the disadvantage that when the tug-boat swings or moves sidewise the guide-rail becomes disengaged from the friction-wheel mechanism, because, as will be readily understood, the several pairs of driving rollers are displaced relatively to one another and no longer constitute a proper driving mechanism adapted to coact with the rail. According to our invention we obviate this defect by assembling one or more pairs of driving rollers to form one integral driving mechanism which is arranged to rock about one single horizontal axis. Preferably this axis is taken parallel to the longitudinal direction of the tug-boat.

Figure 2:
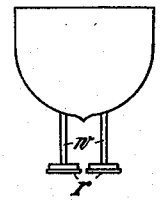
Figure 3:
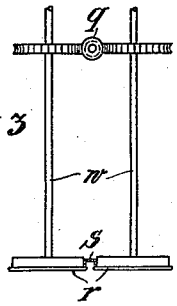
Figure 4:
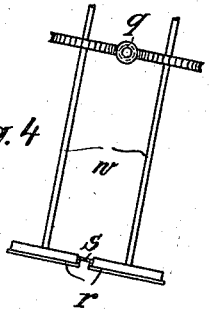
Figure 5:
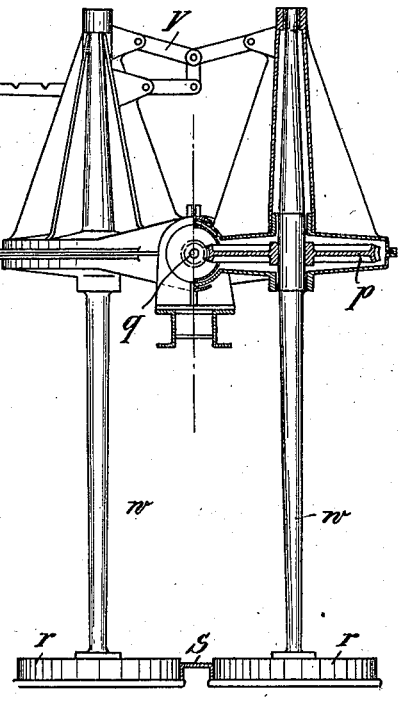
Figure 8:
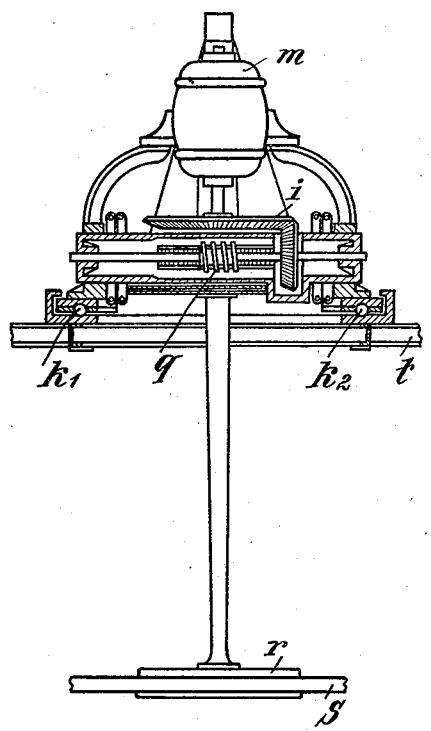
Figure 9:
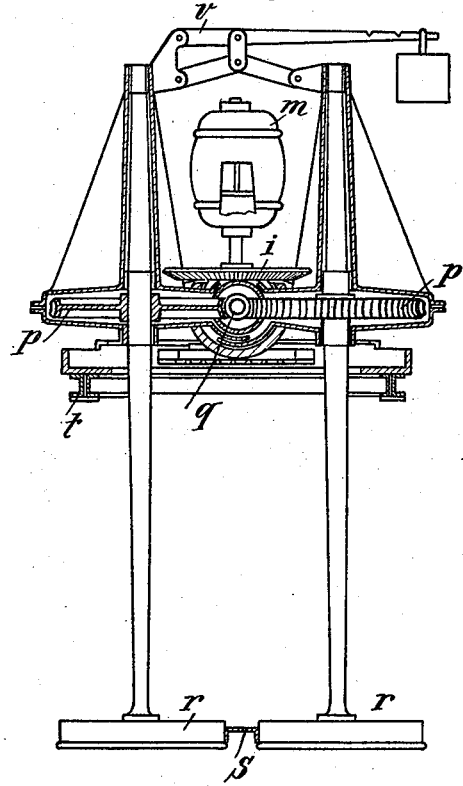
Figure 12:
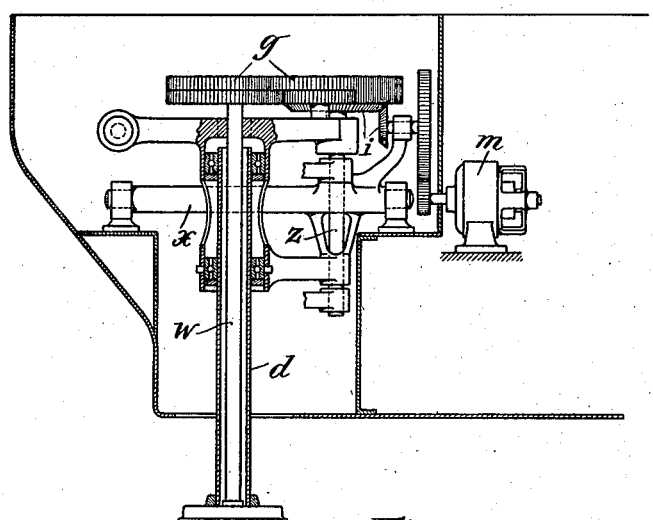
Figure 13:
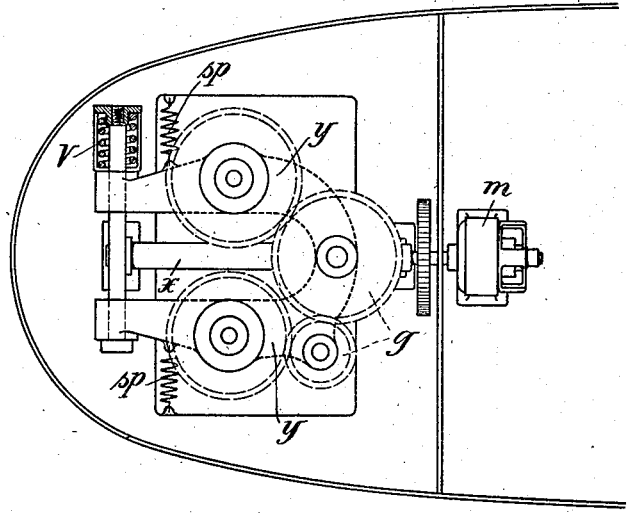

These and other improvements described hereinafter and pointed out in the claims will be understood by reference to the accompanying drawings, wherein Figure 1 is a longitudinal view of a tug-boat having a driving mechanism according to our present invention, and Fig. 2 is a front view of the same; Fig. 3 shows a pair of friction rollers which are mounted to rock about a common horizontal axis, Fig. 4 represents the manner in which a pair of friction rollers according to Fig. 3 can swing toward the side in the event of the tug-boat swinging, and Fig. 5 shows some details of the construction diagrammatically shown in Fig. 4; Fig. 6 is a side elevation, partly in section on the line 1—2 in Fig. 7, showing a construction comprising two pairs of friction roller mechanisms driven conjointly, each pair being arranged to rock independently of the other about a common horizontal axis, and Fig. 7 is a top plan view thereof, partly in section on the line 3—4 in Fig. 6; Fig. 8 is a side elevation, partly in section of a driving mechanism comprising one pair of friction rollers which can rock in the same manner as in the construction shown in Fig. 5, and which in addition can swing about a vertical axis, and Fig. 9 is a front elevation, partly in section, of the construction shown in Fig. 8; Fig. 10 is an elevation, partly in section, of an arrangement similar to that shown in Fig. 6, but in which the two pairs of friction rollers can also be swung about a common vertical axis; and Fig. 11 is a top plan view, partly in section, of the construction shown in Fig. 10; Fig. 12 is a vertical section through one end of a tug-boat, and Fig. 13 is a top plan view of the same, partly in section.

In Figs. 3 and 4 we have shown the above mentioned arrangement of a pair of friction rollers which is built together with a common driving mechanism and can be conjointly rocked about a single horizontal axis. Both the shafts $w$ of the friction rollers $r$ are driven by means of a single worm gear $q$ and are simultaneously arranged to permit rocking about the axis $q$ of the driving worm constituting a common fulcrum. If swinging or lateral motions of the tug-boat take place, in this construction the individual pairs of the driving rollers $r$ will keep the guide rail S gripped between themselves irrespective of the fluctuations or the lateral motions of the axis $q$, as shown in Fig. 4, so that slipping out of the guide rail is prevented. In order to positively guide the tug-boat several pairs of friction rollers arranged one behind the other in the direction of the guide rail will be necessary, and when these are united to form one driving mechanism, they can be arranged to rock conjointly about one common axis in the like manner as the pair of friction rollers shown in Fig. 5.

When several pairs of friction rollers are employed which are assembled to form one single driving mechanism, there is danger that owing to the small distance of the pairs of driving rollers from each other, the rail will be sharply bent as soon as laterally deflecting forces, for instance lateral currents of air or water act upon the hull of the boat, because the guide rail is subjected to bending stresses by a pair of forces acting in a horizontal direction. The bending moments thus occurring with the same deflecting forces are greater the longer the boat and the smaller the distance between the end pairs of rollers. A suitable increase in the distance between the outermost pair of driving or guiding rollers can be obtained only with difficulty, if only one driving mechanism is used which is constructed to permit the pairs of rollers to swing. Also, if curves of a river or canal are to be passed, the pairs of rollers of a single driving mechanism must not extend too far in the direction of the guide rail. Inadmissibly high bending stresses on the guide rail in a horizontal direction due to forces which tend to turn the boat can be prevented by a construction in which the pairs of rollers for driving and guiding the tug-boat are assembled to form several driving mechanisms which are mounted to rock transversely of the direction of the guide rail independently of each other and one behind another in the direction of the guide rail. This arrangement enables the tug-boat to pass curves and permits the several driving mechanisms to be arranged at any desired distance from each other.

Referring to Figs. 6 and 7, each of the driving rollers $r$ coöperates in the well known manner with a second friction roller coacting with the opposite side of the guide rail S, and they are driven by a motor $m$ through a gear wheel $g$ and are individually mounted to rock about an axis $q$ located parallel to the longitudinal direction of the tug-boat. Each pair of friction rollers thus forms an independent driving mechanism. The distance between the two driving mechanisms may be made as great as desired, because such pairs of rollers which can swing independently of each other permit the tug-boat to pass curves. This arrangement of a plurality of driving mechanisms able to rock independently of each other has the additional advantage that in those cases in which the action of one driving mechanism is sufficient for propelling the tug-boat, the second driving mechanism may be uncoupled from the motor, but may still serve as a guiding roller mechanism if desired. In this arrangement the motor of the second driving mechanism may simply be brought to a standstill. Each of the driving mechanisms, of course, may also comprise a plurality of pairs of rollers. Likewise, instead of employing a plurality of driving mechanisms, one single driving mechanism may be used and then one or more pivotally mounted roller groups which are not driven may be used for positively guiding the tug-boat.

The bending stresses acting on the guide rail when forces tend to rotate the hull of the boat can be decreased, and the tug-boat can more easily pass curves if the roller groups coacting with the rail for driving and guiding the tug-boat and united to form one or more driving mechanisms are arranged to revolve or to be swung about one or more vertical axes in such a manner that the hull of the boat can rotate under the influence of external forces within the practically necessary limits and independently of the driving mechanisms. The rotation of the boat in this case takes place without subjecting the rail to bending stresses.

Figs. 8 and 9 show a driving mechanism comprising one pair of friction rollers $r$ upon whose shafts are mounted the worm wheels $p$ driven by the motor $m$ through a gear mechanism $i$ and a driving worm $q$. The two friction rollers can rock individually about the axis of the worm $q$ and they can be swung conjointly about a vertical axis. The entire driving mechanism rests on horizontal ball-bearings $k_1$, $k_2$ which enable the same to be rotated in a horizontal plane about a vertical axis. The frames of the ball-bearings are supported by a frame $t$ united with the frame of the tug-boat. In the construction shown an angle of rotation of 360° is provided for. In case only limited capability of rotation is required, the lower frames of the ball-bearings may be constructed in the form of segments.

This mode of construction is particularly advantageous for tug-boats having a plurality of driving mechanisms which are arranged one behind another in the direction of the guide rail and are rotatable about a common vertical axis. The driving mechanisms which are rotatable about the common journal will then, similar to the front and rear sets of wheels in the trucks of railroad cars, be able to adjust themselves individually in a tangential direction to the curve of the guide rail, while the boat will adjust itself into the direction of a chord drawn between the points of application of the several driving mechanisms. The passage of any desired curves which may differ from one another is possible without difficulty when employing the above described construction which automatically adapts itself to every degree of curvature.

In the construction shown in Figs. 10 and 11 two driving mechanisms are mounted one behind the other in the longitudinal direction of the guide rail on a common iron frame $e$, which rests upon ball-bearings $k_1$, $k_2$, $k_3$, $k_4$ whose lower segmental bearing frames are fixed on the supporting frame $t$ united with the frame of the boat. The driving mechanisms together with the driving motor are rotatable in common about a vertical journal $z$.

The construction of the horizontal bearings necessary for enabling rotation of the driving mechanisms in a horizontal direction does not form part of the subject-matter of our present invention; any desired suitable construction may be used, such as guiding devices comprising plain bearings, roller-bearings or ball-bearings.

It is preferable to make the distance between the outermost pairs of rollers as large as possible in order to decrease the bending stresses imposed upon the rail in a vertical direction, to which said rail is subjected when it is lifted from the bottom of the river or canal. For a given size of tug-boat the greatest distance between the pairs of friction rollers is obtained by arranging the driving mechanisms at the ends of the boat, as shown by way of example in a general view in Fig. 1. This construction results in further advantages, in that the middle part of the tug-boat remains free for the accommodation, for instance, of the power plant for driving the boat, the driving mechanisms being located at those parts of the boat which are of little value for its carrying capacity.

In Figs. 12 and 13 the driving mechanisms provided in the bow and stern of the tug-boat are shown as comprising a single pair of friction rollers; the driving mechanism, however, may comprise a plurality of pairs of friction rollers if desired.

In order to facilitate the towing service, a damping or buffer device of any suitable known kind may be provided between the parts which are rotated relatively to one another in a horizontal plane, such as the frame of the boat and the frame of the driving mechanism. Furthermore, the pressure which exists between the parts rotated relatively to one another can be measured by means of indicating devices. These pressure indicating devices are preferably provided with known mechanism for automatically adjusting the rudder of the tug-boat.

The pressure exerted between the friction rollers and the rail can be regulated by devices for moving the rollers closer together, these devices being actuated either by hand or positively by the tractive force of the tug-boat. In order to avoid joints in mechanism under water such roller closing devices are preferably applied to the driving mechanisms above the level of the water, as shown by way of example in Figs. 5 and 9. The devices for regulating the pressure may act directly on the shafts transmitting rotation to the friction rollers, as shown in Fig. 5, or separate shafts concentric with the former may be provided, which transmit the pressure to the friction rollers. In Figs. 12 and 13 we have shown a further construction of this kind for a pair of friction rollers in which each roller shaft is mounted to rock about an axis $x$ parallel to the direction of the guide rail and to revolve about the vertical axis $z$. The shafts transmitting rotation to the friction rollers are driven by a set of gear wheels $g$ carried by the frame $y$. The interior resilient axle $w$ will readily follow slight changes in the distance between the friction rollers, so that the pressure which holds the friction rollers against the rail can be regulated by means of the pressure shafts $d$ independently of the gear-wheels for rotating the driving rollers. The external pressure shafts are preferably made so powerful that they can transmit to the friction rollers large pressures while they are themselves deflected only slightly. It is also possible to employ separate pressure shafts with driving mechanisms mounted to rock about a single horizontal axis, such as are shown by way of example in Figs. 12 and 13. The friction rollers are driven by means of gear wheels $g$ and bevel gearing $i$ by the motor $m$. The rotatory motion of the friction rollers which is necessary for driving the tug-boat is transmitted by means of the shafts $w$, while the pressure for pressing said rollers against the guide rail is transmitted by means of the pressure shafts $d$ which carry said rollers at their lower ends. The shafts $w$, $w$, for transmitting said rotatory motion are mounted fixedly to the boat, while the pressure shafts are mounted to permit swinging. The shafts $w$, $w$ and $d$, $d$ together with the gears $g$, $g$ and $i$, $i$ shaft $z$, frame $y$, etc., will swing as a unit around the vertical axis $x$. Independently of this rocking movement about the axis $x$, each arm of the frame $y$ is capable of revolving on the vertical axis $z$, thus providing for primary adjustment of the interval between the pressure rollers. The pressure exerted by the rollers may be regulated by means of the spring $V'$. In this construction therefore the driving mechanism is so mounted that it can be moved about a certain point within certain limits in any direction without causing its several parts to be displaced relatively to one another, that is to say, it can swing and rotate simultaneously. The center of rotation or swinging of the driving mechanism as a whole is located at the point of intersection of the shafts $z$ with the shaft $x$.

As mentioned above, in order to prevent impacts occurring between the body of the tug-boat and the driving mechanism when relative displacement takes place between these two, damping means may be inserted between said driving mechanism and the body of the tug-boat. These damping means are indicated in Fig. 13 in the form of springs $sp$ which are interposed between the forks $y$ and the frame of the tug-boat.

Having thus described our invention we claim as new and desire to secure by Letters Patent of the United States:—

1. In a towing system, the combination of a boat carrying a motor, a driving mechanism comprising a pair of shafts and rollers at the ends thereof adapted to grip a rail in the water, said shafts being mounted to rock about one common horizontal axis constituting a common fulcrum for the same, and means driven by the motor for rotating the shafts.

2. In a towing system, the combination of a boat carrying a motor, a driving mechanism comprising a pair of shafts and rollers at the ends thereof adapted to grip a rail in the water, said shafts being mounted to rock about one common horizontal axis constituting a common fulcrum for the same and mounted to revolve horizontally about one common vertical axis, and means driven by the motor for driving the shafts.

3. In a towing system, the combination of a boat carrying a motor, a plurality of pairs of shafts each having a friction roller at its end adapted to grip a rail in the water, each pair of rollers being mounted to rock laterally independently of the others about one common horizontal axis constituting a common fulcrum for said shafts, and means driven by the motor for rotating some of the pairs of shafts.

4. In a towing system, the combination of a boat carrying a motor, a driving mechanism comprising a plurality of pairs of shafts each having a friction roller at its end adapted to grip a rail in the water, said rollers being mounted to rock laterally about one common horizontal axis constituting a common fulcrum for said shafts, and to revolve horizontally about one common vertical axis, and means driven by the motor for driving the shafts.

5. In a towing system, the combination of a boat carrying a motor, a plurality of spaced pairs of shafts each having a friction roller at its end adapted to grip a rail in the water, each pair of shafts being mounted to rock about a common horizontal axis, constituting a common fulcrum for said shafts, and means driven by the motor for rotating the rollers of at least one of said pairs of rollers about their own axes.

6. In a towing system, the combination of a boat carrying a motor, and a driving mechanism connected with the motor, said mechanism comprising a worm gear, two shafts, a pair of friction rollers carried by the shafts and adapted to grip a rail in the water, and a pair of gear wheels carried by the shafts and meshing with said worm gear at opposite sides thereof, said shafts being mounted to rock about the worm gear which constitutes a common fulcrum for the same.

7. In a towing system, the combination of a boat carrying a motor, and a driving mechanism connected with the motor, said mechanism comprising a horizontal worm gear, two shafts, a pair of friction rollers carried by the shafts and adapted to grip a rail in the water, and a pair of gear wheels carried by the shafts and meshing with said worm gear at opposite sides thereof, said shafts being mounted to rock about the worm gear which constitutes a common fulcrum for the same, and said driving mechanism being mounted to rotate as a whole about a vertical axis.

8. In a towing system the combination of a boat carrying a motor, a driving mechanism comprising a pair of rollers adapted to grip a rail in the water, said rollers being mounted to rock laterally independently of one another about one common horizontal axis constituting a common fulcrum for the same, and means driven by the motor for rotating the rollers about their own axes.

9. In a towing system, the combination of a boat carrying a motor, a plurality of driving mechanisms mounted to revolve about a common vertical axis and each comprising a pair of rollers adapted to grip a rail in the water, the rollers being mounted to rock laterally independently of one another about one common horizontal axis constituting a common fulcrum for the same, and means driven by the motor for rotating the rollers about their own axes.

10. In a towing system, the combination of a boat carrying a motor, a driving mechanism comprising a pair of shafts and rollers at the ends thereof adapted to grip a rail in the water, said shafts being mounted to rock about one common horizontal axle constituting a common fulcrum for the same, means driven by the motor for rotating the shafts, and a pressure device acting on said shafts and tending to cause the rollers to approach one another.

11. In a towing system, the combination of a boat carrying a motor, a driving mechanism comprising a pair of rollers adapted to grip a rail in the water, said rollers being mounted to rock laterally independently of one another about one common horizontal axle constituting a common fulcrum for the same, and to swing as a whole about one common vertical axis, means driven by the motor for rotating the shafts about their longitudinal axes, and buffer means operatively connected between the driving mechanism and the frame of the boat.

12. In a tug-boat, the combination of a plurality of driving mechanisms which are arranged at some distance from each other, each of said driving mechanisms consisting of a plurality of friction rollers adapted to grip a guide rail which is mounted on the water bed, and each of said driving mechanisms being mounted to permit it to swing laterally around a horizontal axis as a unit and independently of the other driving mechanisms.

13. In a tug-boat, the combination of a plurality of driving mechanisms which are arranged at some distance from each other, each of said driving mechanisms consisting of plurality of friction rollers adapted to grip a guide rail which is mounted on the water bed, and each of said driving mechanisms being mounted to permit it to rotate around a vertical axis and simultaneously to swing laterally around a horizontal axis, as a unit and independently of the other driving mechanisms.

In witness whereof we have hereunto set our signatures in the presence of two subscribing witnesses.

GEORG MEYER.
EMIL WALTZ.

Witnesses:
HENRY HASPER,
WOLDEMAR HAUPT.

Copies of this patent may be obtained for five cents each, by addressing the "Commissioner of Patents, Washington, D. C."